United States Patent
Griffin

[11] 3,971,541
[45] July 27, 1976

[54] MANUALLY OPERABLE SELF-CLOSING VALVE

[76] Inventor: Raymond E. Griffin, 9442 W. Pine, Mokena, Ill. 60448

[22] Filed: Jan. 3, 1975

[21] Appl. No.: 538,363

[52] U.S. Cl. .............................. 251/347; 251/348; 251/320; 251/342
[51] Int. Cl.² ........................................ F16K 31/44
[58] Field of Search ....... 128/292, 294, 295, 350 V; 222/213; 251/342, 344; 137/533.21, 238, 513.3, 513.5; 251/323, 319, 320, 347, 348

[56] References Cited
UNITED STATES PATENTS

| | | | |
|---|---|---|---|
| 558,034 | 4/1896 | Brown et al. | 137/533.21 |
| 1,037,509 | 9/1912 | Moody | 137/533.21 |
| 1,189,293 | 7/1916 | Robinson | 137/533.21 |
| 1,623,866 | 4/1927 | Egenhoff | 251/347 |
| 1,764,181 | 6/1930 | Raetz et al. | 137/513.5 |
| 2,095,696 | 10/1937 | Hackel | 251/323 |
| 2,216,921 | 10/1940 | Marvel | 137/238 |
| 2,623,787 | 12/1952 | Smith | 251/342 |
| 2,925,243 | 2/1960 | Griswold | 251/284 |
| 2,988,323 | 6/1961 | Conrad | 251/347 |
| 3,530,928 | 9/1970 | Swinney | 251/342 |

FOREIGN PATENTS OR APPLICATIONS

| | | | |
|---|---|---|---|
| 628,167 | 3/1936 | Germany | 251/342 |
| 126,961 | 12/1928 | Switzerland | 251/342 |

*Primary Examiner*—William R. Cline
*Assistant Examiner*—H. Jay Spiegel
*Attorney, Agent, or Firm*—David D. Kaufman

[57] ABSTRACT

A valve having two body members and elastic means connected therebetween to normally bias the valve into the closed condition. The valve is opened by pulling one body member away from the other, and it closes automatically upon release. Biasing spring means is likewise provided to insure positive sealing.

9 Claims, 8 Drawing Figures

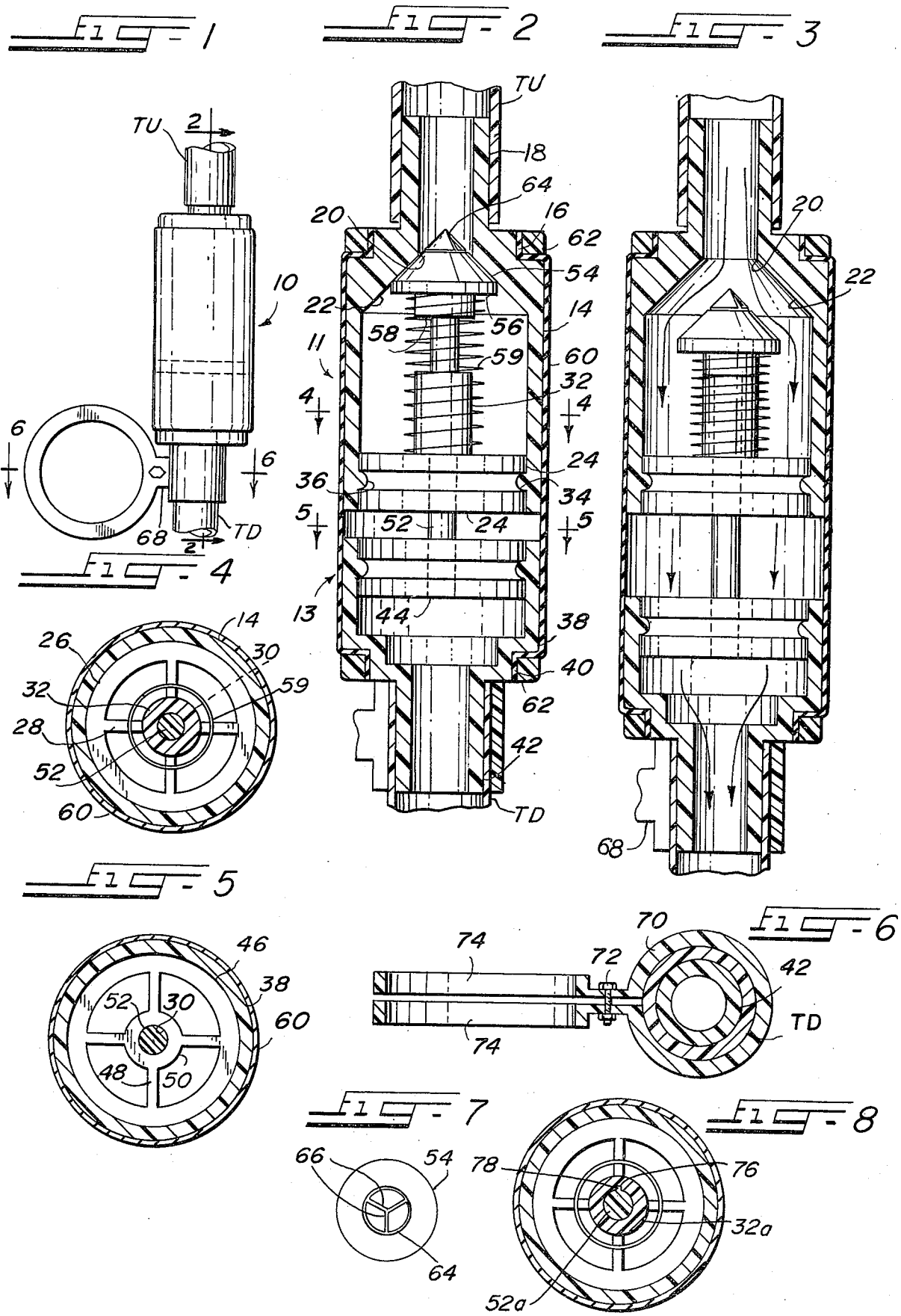

MANUALLY OPERABLE SELF-CLOSING VALVE

This invention relates to valves and more particulary to a manually operable valve which automatically closes itself when the opening action is released.

A primary consideration regarding valves in certain uses or applications is the ease and simplicity with which they can be manipulated by the users thereof. This consideration is especially important where the users are handicapped or incapacitated, as in the case of paraplegics, quadriplegics, incontinents, and stroke or heart attack victims.

Very often, for example, such handicapped persons are required to use and wear urine bags of relatively standard and well known construction. Typically, the urine bag comprises a flexible or expansible container which is strapped to the thigh or torso or supported from a wheel chair. The bag is provided with an inlet opening and an outlet opening, the latter communicating with a generally rigid nipple or outlet pipe extending therefrom.

For purposes of emptying the bag, ordinary medical type rubber tubing is connected to the outlet nipple and one of two basic types of closure means is employed therewith as a control closure or valve. The first, and still widely used, is a toggle-action pinch clamp made of familiar metal construction and mounted directly on the outlet tubing. Such pinch clamps are extremely difficult to operate, requiring substantial finger pressure for the separate opening and clamping manipulations thereof. In addition, these clamps sometimes lose their resiliency after continued use or tear the rubber tubing with the repeated frictional pinching action; in either case, causing a leak to result.

In recognition of the disadvantages of the described pinch clamps, there have more recently been proposed various forms of valves which are adapted to be connected at their opposite ends to the rubber tubing to be directly in the line of flow therethrough. To my knowledge, however, none of these valves has proved satisfactory for a number of reasons. The most serious shortcoming is the fact that two separate and sometimes complex actions, frequently requiring nimble and strong fingers, are necessary to open and then close the prior valves. Other disadvantages stem from their high cost and their tendency to clog or otherwise malfunction, it being remembered that such valves must occasionally be replaced for hygienic reasons as well as normal wear and breakdown.

For the reasons alluded to, use of the prior art clamps and valves is troublesome under any conditions, that is, in any type of low pressure liquid system and used by normal or healthy persons. However, the problems become acute when used by handicapped persons in a system of the type described. In this regard, it should be noted that many of the persons under consideration have insufficient hand strength and motility or, perhaps, an artificial limb. Moreover, such persons sometimes are afflicted with spasms and seizures which, if they were to occur while the clamp or valve was in the open condition, would result in upleasant accidents.

It is therefore a principle object of this invention to provide a manually operable valve for use in low pressure liquid systems of the type indicated which overcomes all of the problems described above.

Another object is to provide an improved valve of the character described which is extremely simple to operate and is, likewise, self-closing when released by the user thereof. A related object is to provide a valve which may be easiy operated with only a single digit of a natural or prosthetic limb.

A further object is to provide an improved valve of the character described having first and second means for urging the valve into the closed condition to positively assure a tight seal. A related object is to provide a valve wherein the external structure of the valve body functions as a closing means and additional interior closing means is provided to insure closure even in the unlikely event of tear or rupture of the valve body.

Still another object is to provide an improved valve of the character described which may be removably connected into any suitable low pressure liquid system with standard rubber tubing or the like.

Yet another object is to provide an improved valve of the character described which may be inexpensively manufactured and yet is small in size, lightweight, durable, sterilizable and otherwise most efficient for the purposes intended.

With the foregoing and other objects in view which will appear as the description proceeds, the invention comprises generally a first body member affording the valve seat and a second body member carrying a valve plug adapted to cooperate with the seat. The two body members are operationally connected together by an elastic sheath or envelope which urges the valve into the closed cdndtion as well as providing the external closure thereof. A pull ring is attached to the second body member which may be readily gripped and pulled to open the valve. Upon release of the pull ring, the elastic envelope automatically urges the valve back into the closed condition. Internal spring means is likewise provided to normally bias the valve into the closed condition and thus insure positive sealing.

For the purpose of facilitating an understanding of my invention, I have illustrated in the accompanying drawings a preferred embodiment and a modified embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is an elevational view of a preferred form of valve embodying the principles of the invention;

FIG. 2 is a longitudinal sectional view taken on the plane of line 2—2 in FIG. 1, with the finger grip broken off, and showing the valve in the closed condition;

FIG. 3 is a similar view showing the valve in the open condition;

FIG. 4 is a sectional view taken on the plane of line 4—4 in FIG. 2 and viewed in the direction indicated;

FIG. 5 is a sectional view taken on the plane of line 5—5 in FIG. 2 and viewed in the direction indicated;

FIG. 6 is a sectional view taken on the plane of line 6—6 in FIG. 1 and viewed in the direction indicated;

FIG. 7 is a plan view of the valve plug illustrating a detail of construction thereof; and FIG. 8 is a sectional view similar FIG. 4 but showing a modified form of construction.

Referring more particularly to the various Figures of the drawings, reference character 10 indicates generally a preferred form of a valve embodying the principles of the invention. The valve 10 is illustrated as it might be removably connected into a typical low pressure system, with rubber tubing TU leading upstream to a liquid container such as a urine bag and tubing TD leading downsteam to act as a discharge orifice, although it will be evident that the latter may be dispensed with if desired.

Valve 10 comprises a first body member 11 and a second body member 13, both of which are shown as being complementarily circular in section and having the same outer diameters at both ends thereof. Body member 11 comprises a cylindrical housing 14 having an external reduced diameter portion 16 and a further reduced diameter neck 18 whose outer diameter typically will be dimensioned to receive thereover, in tight frictional engagement, standard rubber tubing such as ⅜ inch diameter. Interiorly, housing 14 is formed with a port 20, which communicates with the bore of neck 18, and an angular wall or valve seat 22.

A stem guide member 24 is mounted in the inner end of the cylindrical housing 14. As indicated in FIGS. 2 and 4, the guide member 24 comprises a wheel 26 and a plurality of radial spokes 28 terminating in an annular hub 30 and elongated axial collar 32. It will thus be appreciated that the wheel and spoke arrangement permits relatively unimpeded flow of liquid through the guide member 24. In the embodiment illustrated, the wheel 26 is fixedly secured in the housing 14 by means of cooperating annular groove 34 and land 36, although any other suitable manufacturing or assembly technique may be employed, such as, adhesives, heat sealing, or the like.

Second body member 13 comprises a cylindrical housing 38 having an external reduced diameter portion 40 and a further reduced diameter neck 42, and is generally complementary and similar in external construction to cylindrical housing 14, but may be shorter in longitudinal length as indicated in the drawiwngs. Fixedly mounted in the inner end of the housing 38 is a stem support member 44. Similar to guide member 24, the stem support member 44 comprises a wheel 46 having a plurality of radial spokes 48 which terminate in an annular hub 50. In this instance, however, there is rigidly secured in the hub 50 an elongated stem 52, which is slidably positioned through the guide collar 32.

A valve plug 54 is carried by, or integrally formed on, the free end of the stem 52. Valve plug 54 is generally conic in configuration and is adapted to mate with valve seat 22 in liquid sealing engagement. Projecting inwardly from the base or inner face 56 of the plug 54 is a short abutment collar 58. A coil spring 59 is mounted around the guide collar 32, stem 52 and abutment collar 58 and bears against the wheel 26 and plug base 56 to normally urge the plug 54 into sealing engagement with the seat 22. Conversely, guide collar 32 and abutment collar 58 cooperate to limit movement of the body members 11 and 13 in opposite directions.

The body members 11 and 13 are connected together in operationally assembled relationship by an elastic tube 60 fitted thereover and firmly but releasably connected at its opposite ends to the reduced diameter cylindrical housing portions 16 and 40 with O-rings 62,62. The tube 60 may be made of relatively thin gauge rubber, or the like, and affords a liquid-tight sheath or evelope for the entire valve structure. The tube 60 likewise is of suitable length so that it is in a relaxed state, or under slight tension, when the valve is in the closed condition. Accordingly, the tube 60 acts as a biasing means normally urging the plug 54 into valve sealing engagement.

Turning to FIGS. 2 and 7 of the drawings, it will be noted that an apex portion 64 of the plug 54 extends through the port 20 when the valve is in the closed condition. A plurality of grooves or cut-outs 66 are formed in the apex portion 64 and are adapted to prevent clogging by accumulation of solids and promote free liquid flow through the valve, by creating turbulence and breaking the steady steam flow.

For ease of operation, there is attached to the neck 42 of second body member 13 a handle or pull member 68. The pull member 68 comprises a resilient split collar 70 adapted to be releasably attached over the rubber tubing TD and neck 42 with a bolt 72 (see FIG. 6). Integrally formed with the split collar 70 is a split pull ring 74,74, through which a single finger or artificial digit may be inserted to operate the valve.

To operate the valve, it is simply necessary to grip the pull ring 74, or insert a finger therethrough, and pull downward against the biasing action of the elastic tube 60 and/or spring 59, causing liquid to flow as indicated by the arrows in FIG. 3. In this regard, it should be noted that the spring 59 may be eliminated and the valve will nonetheless operate satisfactorily under the biasing action of the tube 60 alone, which tube would then be of correspondingly heavier gauge or under higher tension. In either case, the total biasing pressure of the tube and spring over the full travel of the plug 54 is on the order of only 3 to 8 pounds. Moreover, the downward or pulling motion is one which may be easily assayed by most handicapped persons as opposed to an upward or lifting motion. Upon release of the pull ring 74, the biasing action of the spring 59 and tube 60 automatically closes the valve.

In the described preferred embodiment, limited rotational movement between the body members 11 and 13 is possible when opening the valve. This capability is actually desirable because of the erratic and non-linear movements of many handicapped persons. However, there may be certain applications of the valve where such rotational motion is to be avoided. For this purpose, there is illustrated in FIG. 8 of the drawings a modified structure wherein similar parts are identified with similar numerals but with the suffix *a* added. In this modification, the guide collar 32a is formed with a longitudinal slot 76 in the inner surface thereof. The stem 52a is formed with a longitudinal key 78 adapted to fit slidably in said slot. With this arrangement, the relative rotational movement is prevented without hindering the necessary sliding motion of the stem 52a.

With the exception of the elastic envelope 60 and the spring 59, all parts of the valve 10 may be easily and inexpensively molded from well known plastics which are light, durable and sterilizable. Although the tube alone will operate the valve, the double biasing action of the envelope and spring insures a positive seal even in the event the envelope were to tear or rupture. Of course, the entire valve may be readily diassembled for purposes of cleaning or replacement.

It should be appreciated that terms such as "upstream", "downsteam", "inner" and "outer " have been used solely for facilitation of description and are not to be construed in any way as limiting of the invention. In this regard, it will be apparent that reversal of parts will not affect materially operation of the valve and is within the scope of the invention.

I claim:

1. A manually operable self-closing valve comprising:
first and second body members having end surfaces in face to face relationship;
the first body member having a port formed therein;
a plug rigidly mounted on the second body member and adapted to seal said port;
an elastic tube fitted longitudinally over said body members and forming a liquid-tight connection therebetween so that the space between said end surfaces is in liquid communication with said tube;
said elastic tube normally urging said plug and port into valve sealing engagement and being longitudinally responsive to linear forces applied to the opposite ends and parallel to the longitudinal axis thereof; and
means on said body members for releasably connecting one or the other thereof into the discharge line of a liquid system.
said valve being operable, after connection of one of said body members into a discharge line, by applying a linear force to the free body member and pulling the same away from the connected body member to open the valve and further separate said end surfaces and releasing the same whereupon said elastic tube automatically urges the valve closed.

2. The valve of claim 1 in which said second body member comprises an elongated stem and support means positioning said stem centrally therein, said plug being mounted on the free end of said stem.

3. The valve of claim 2 in which said first body member comprises a guide member and support means positioning said guide member centrally therein, said guide member slidably accommodating said stem therethrough.

4. The valve of claim 3 which each of said support means in said first and second body members comprises a plurality of radial spokes.

5. The valve of claim 3 and spring means positioned around said stem and cooperating with said plug and last-mentioned support means to normally urge said plug into valve sealing engagement.

6. The valve of claim 5 in which said guide member comprises an elongated collar, the free end of said collar cooperating with said plug to limit movement of said body members apart.

7. The valve of claim 5 and key and slot means formed on said stem and guide member, said key and slot means cooperating to prevent relative rotational movement between said first and second body members.

8. The valve of claim 5 in which said first body member is connected into the discharge line, the upstream surface of said plug is generally conic, and said first body member is formed with a complementarily conic valve seat on the downsteam side of said port, whereby portions of said conic plug extend through said port when the plug and port are in sealing engagement, said extending plug portions being formed with a plurality of flow cut-outs adapted to create liquid turbulence and prevent clogging accumulation of solids.

9. The valve of claim 1 and pull means rigidly connected to said free body member and adapted to be gripped manually for pulling said body members apart to open said valve.

* * * * *